United States Patent [19]

Ducarre

[11] 4,116,943

[45] Sep. 26, 1978

[54] POLYESTER-AMIDES

[75] Inventor: Michel Ducarre, Sainte-Foy-Les-Lyon, France

[73] Assignee: Rhone-Poulenc-Textile, Paris, France

[21] Appl. No.: 777,576

[22] Filed: Mar. 15, 1977

[30] Foreign Application Priority Data

Mar. 22, 1976 [FR] France .................. 76 08420

[51] Int. Cl.$^2$ .............................. C08G 63/68
[52] U.S. Cl. ...................... 528/292; 528/288
[58] Field of Search ....................... 260/75 N

[56] References Cited

U.S. PATENT DOCUMENTS 4,002,600  1/1977  Habermeier ............... 260/75 N

FOREIGN PATENT DOCUMENTS 2,193,845  7/1973  France ..................... 260/75 N

*Primary Examiner*—Lucille M. Phynes
*Attorney, Agent, or Firm*—Stevens, Davis, Miller & Mosher

[57] ABSTRACT

A moldable polyester-amide is disclosed characterized in that it is derived from:
  an aromatic organic diacid (1) whose carboxyl groups are directly attached to an aromatic ring in the para-position;
  a primary diol (2) of the general formula HO—CH$_2$—R—CH$_2$—OH in which R represents either a straight aliphatic chain comprising at least 4 carbon atoms, or an aliphatic chain branched by alkyl or aryl groups, or an aromatic ring; and
  a salt of an organic diacid (3) and a primary diamine of aliphatic character (4);
  and being further characterized in that it possesses a degree of whiteness equal to or greater than 80% and a luminosity equal to at least 35%, as defined in standard specification ASTM-E 308-66, a number of —NH$_2$ end groups equal to or greater than 30 per ton of polymer, preferably greater than 40.

A shaped article (e.g., a yarn, a film, or a fiber) derived from the aforesaid polyester-amide is also disclosed.

4 Claims, No Drawings

POLYESTER-AMIDES

The present invention relates to new polyester-amides which can be spun and molded. More particularly, the present invention relates to improved polyester-amides having a high melting point and a high whiteness.

From U.S. Pat. No. 2,281,415, ester-amide copolymers are already known which are obtained by the reaction of a composition capable of forming amide links such as mixtures of diacids, diamines and a composition capable of forming ester links; the diacid or its alkyl diester and the diol being hydrocarbon side-chain substituted, for example 2,2-dimethyl-propane diol or 2,2-diethyl-propane diol.

French Pat. No. 2,193,845 also proposes the use of 2,2-dimethyl-propane diol and states that such a branched diol has the advantage over a straight-chain diol of avoiding any coloration in the resulting polyester-amide. However, such polymers, even if they can be spun, are not sufficiently white, exhibit an amorphous structure, and generally have melting points too low to have a valuable use in the field of textiles.

The preparation of polyester-amides with free OH groups by the reaction of dimethyl terephthalate with at least one diamine and one diol containing at least three hydroxyl groups, is also known. However, the resulting polymers, which are crosslinked because of the presence of the polyol, are used only as electrical insulating materials.

Finally, the possibility is considered in French Pat. No. 1,308,219 of preparing polyester-amides from aliphatic diols and from diacids having the general formula:

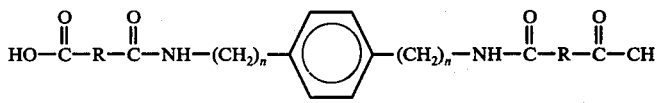

in which $n$ is an integer from 1 to 4 and R an aliphatic radical of from 2 to 10 carbon atoms. However, such polymers have a very poor dyeing affinity for acid dyestuffs.

New moldable polyester-amides have now been found which are characterised in that they are derived: from an aromatic organic diacid (1) whose carboxyl groups are directly attached to an aromatic ring in the para-position, from a primary diol (2) of the general formula HO—$CH_2$—R—$CH_2$—OH, in which R represents either a linear aliphatic chain having at least 4 carbon atoms, optionally branched with alkyl or aryl groups, or an aromatic ring,
and from a salt of an organic diacid (3) and a primary diamine of aliphatic character (4);
that they have a degree of whiteness greater than or equal to 80% and a luminosity greater than or equal to 35%, as defined in standard specification ASTM E 308-66,
and that they have a number of terminal —$NH_2$ groups, per ton of polymer, equal to or greater than 30, preferably greater than 40.

Preferably they have a melting point equal to or greater than 180° C., in order to be usable in the field of synthetic textiles.

The aromatic diacids (1) which have their carboxyl groups directly attached to the aromatic ring in the para-position are terephthalic acid, naphthalene-2,6-dicarboxylic acid, 4,4'-dicarboxy-diphenylsulphone, 4,4'-dicarboxy-diphenyl ether, 4,4'-dicarboxy-diphenylmethane, and diphenic acid; the diacids can optionally be substituted in the aromatic ring by various functional groups such as halogens, alkyl groups, sulphonated groups in the form of the alkali metal salts, and the like. Amongst the diacids, terephthalic acid is preferable because of its availability, its fairly low price, and the particularly valuable polymers to which it leads (with respect to degree of whiteness, ease of conversion and the like). Other diacids such as certain aliphatic or aromatic diacids can be used conjointly in small quantities, for example up to 10 mol % relative to the aromatic diacids (1). Amongst such diacids may be mentioned adipic, sebacic, succinic, dodecandioic, and isophthalic acids.

Amongst the primary diols (2) of the general formula HO—$CH_2$—R—$CH_2$—OH in which R represents either a straight aliphatic chain having at least 4 carbon atoms, which is optionally branched with alkyl or aryl groups, or an aromatic ring, there may be mentioned 1,6-hexanediol, 1,12-dodecanediol, and the like.

The organic diacid (3) is preferably chosen from amongst the aromatic diacids (1) and can be identical or different to the diacid (1). Amongst the diacids (3) terephthalic acid is also preferably used.

Amongst the primary diamines of aliphatic character (4) which can be used to obtain the polyester-amides according to the present invention, there may be mentioned meta- and para-xylenediamine, dodecamethylenediamine and, preferably, 1,6-hexanediamine. By primary diamines of aliphatic character are meant diamines whose —$NH_2$ groups are not attached directly to an aromatic ring.

The polyester-amides according to the present invention are characterised by a Y luminosity equal to at least 35%, and a degree of whiteness greater than or equal to 80%, as defined in the Regulations of the International Commission on Lighting, which appear in standard specification ASTM E 308-66.

They are much less colored than the polymers derived from 2,2-dimethyl-propanediol as described in French Pat. No. 2,193,845, as is shown below in Example 3.

They also have the advantage of possessing a large number of —$NH_2$ end groups, allowing very easy dyeing by means of acid dyestuffs, of shaped articles which are derived therefrom.

The proportion of ester groups to amide groups in the polymer can vary within wide limits; it depends on the diacids, the diols and the diamines used; in certain cases, the ratio of ester groups/amide groups must be chosen in such a way that there is phase-compatibility between the different units, in order to obtain polymers which are convertible by spinning or film-casting.

For example, in the case of a copolymer derived from terephthalic acid, 1,6-hexanediol and the 1,6-diaminohexane/terephthalic salt, the proportion of ester units:amide units must not be less than 70:30. Beyond this, the polymer occurs as a heterogeneous form in the molten state, and it becomes difficult to spin or to film-cast.

For use in the field of synthetic textiles, it is also desirable to choose crystallisable polymer compositions by varying the starting monomers; for example by choosing diols of the general formula HO—CH$_2$—R—CH$_2$—OH, in which R represents an unbranched straight aliphatic chain, and primary diamines of aliphatic character with unsubstituted carbon chains which may contain one or several aromatic rings having a para-para structure. Because of this, the polyester-amides according to the present invention have a melting point equal to or greater than 180° C.

The polyester-amides according to the present invention can be prepared simply by reacting the three components mentioned above simultaneously in the presence of a usual esterifying catalyst, for example titanium compounds such as triethanolamine orthotitanate. The reaction mixture is heated to a temperature of at least 200° C. and generally a temperature less than 250° C., which temperature cause the esterification and amidification reactions to take place, the water formed being distilled off; thereafter the reactor is progressively placed under vacuum whilst the temperature is raised to about 270° C. As the pressure is decreased, the excess diol is removed by distillation. The polyester-amides thus obtained are extruded in strand form and ground.

In the case where such polymers have a melting point equal to or greater than 180° C., where they are crystallisable and where the ratio of ester groups/amide groups is such that there is phase-compatibility between the ester groups and the amide groups, they are, on the whole, destined to be melt-spun or converted to films; the yarns thus obtained can be stretched in the usual manner, for example over a hotplate or hot finger or in an oven.

Such yarns possess excellent textile properties and a good dyeing affinity for acid dyestuffs because of the large number of —NH$_2$ end groups, as well as a good moisture absorption. Films derived from polymers of the present invention also possess excellent properties.

In all cases they can be molded in accordance with any process well known to those skilled in the art, that is to say by injection or compression, and blow molding, and the plastics thus obtained may be employed for numerous uses.

The examples which follow, in which the parts are expressed by weight, are given by way of indication, but without implying any limitation, to illustrate the invention.

EXAMPLE 1

1,494 parts of terephthalic acid, 2,124 parts of 1,6-hexanediol, 846 parts of the salt obtained from terephthalic acid and hexamethylenediamine, and 0.6 part of triethanolamine orthotitanate are introduced simultaneously into an autoclave equipped with the usual means for heating and regulation.

The temperature is raised progressively to 235° C., and at the end of 1 hour 30 minutes, the full theoretical quantity of water formed is collected.

A further 0.6 part of triethanolamine orthotitanate is added and the pressure is progressively reduced to 0.5 mm Hg over a period of 1 hour, whilst the temperature is raised to 267° C., which removes the excess hexanediol. The polycondensation is carried out over a period of 3 hours at 267° C. under 0.5 mm Hg. A white polymer is obtained which is extruded in the form of strands and then ground into granules.

| | |
|---|---|
| ratio of ester units/amide units | 75/25 |
| intrinsic viscosity | 0.79 |
| (measured on a 0.5% strength solution in a 60/40 mixture of phenol/tetrachloroethane, at 25° C) | |
| viscosity in the molten state at 260° C | 1,540 poise |
| number of —COOH end groups per ton of polymer | 54 |
| number of —NH$_2$ end groups per ton of polymer | 59 |
| softening point | 216° C |
| degree of whiteness (as defined in standard specification ASTM E 308–66) | 85% |
| luminosity | 51.4% |
| dominant wavelength | 573.6 nm |
| (as defined in standard specification ASTM E 308–66) | |

The polyester-amide thus prepared is melt-spun through a spinneret comprising 7 orifices of 0.34 mm diameter.

The polymer which melted at 235° C. is spun at 250° C. The filaments are then stretched to a ratio of 2.95, over a finger at 40° C. and a plate at 85° C., at a speed of 150 m/minute.

The yarns thus obtained have the following characteristics:

| | |
|---|---|
| Gauge per strand | 2.22 dtex |
| Elongation | 16.7% |
| Tenacity | 25 g/tex |
| Modulus of elasticity | 350 g/tex |

The stretched yarns, when examined by means of X-rays, show a high degree of crystallinity.

EXAMPLE 2 (COMPARISON)

The same raw materials are used as in Example 1 except that the 1,6-hexanediol is replaced by neopentylglycol (as proposed in French Pat. No. 2,193,845).

An autoclave identical to that used in Example 1 is charged with: 498 parts of terephthalic acid, 624 parts of neopentylglycol (2,2-dimethyl-propane diol), 282 parts of the salt derived from terephthalic acid and hexamethylenediamine, 0.19 part of triethanolamine orthotitanate, 0.27 part of phosphorous acid, and 0.30 part of triphenyl phosphite.

The phosphorous acid and the triphenyl phosphite are used in French Pat. No. 2,193,845, in order to avoid the coloration which can be produced by the neopentylglycol. The method of working is exactly the same as in Example 1.

A highly colored polymer with intrinsic viscosity 0.83 (measured in the same way as above) is obtained.

| | |
|---|---|
| Degree of whiteness | 40% |
| Y luminosity | 21.3% |
| Dominant wavelength | 579.6 nm |
| Softening point | about 140° C |

Given the amorphous character of the polymer, the melting point cannot be determined with precision, and only the softening point can be measured (with a penetrometer).

From this experiment it is clearly evident that the substitution of neopentylglycol for 1,6-hexanediol results in a yellow coloration and too low a softening point, which characteristics rule out any use in the field of textiles.

EXAMPLE 3

(comparison, in accordance with Example 4 of French Pat. No. 2,193,845)

70 g (0.48 mol) of adipic acid, 49.90 g (0.48 mol) of neopentylglycol, 137.3 g (0.52 mol) of the salt of adipic acid and hexamethylenediamine, 65 ml of distilled water, 40 mg of phosphorous acid and 100 mg of triphenyl phosphine are placed in a 500 ml reactor.

After purging the air with nitrogen, the mixture is heated to 100° C. by means of an oil bath. Thereafter 77 mg of tetrabutyl orthotitanate are added and the mixture is heated continuously for 5 hours to a final temperature of 270° C., under a vacuum of 2 mm Hg applied for 2 hours.

The product thus obtained is extruded. It is relatively non-viscous and colored.

It has the following characteristics:

| Degree of whiteness | 60% |
|---|---|
| Y luminosity | 23% |
| Dominant wavelength | 578.9 nm |

From this example, carried out exactly under the conditions of Example 4 of French Pat. No. 2,193,845, it is evident that despite the presence of antioxidants, the polymer does not possess sufficient whiteness.

EXAMPLE 4

1,494 parts of terephthalic acid, 2,124 parts of 1,6-hexanediol, 1,098 parts of the salt of terephthalic acid and dodecamethylenediamine, and 0.655 part of triethanolamine orthotitanate are introduced simultaneously into an autoclave provided with the usual means of heating and regulation.

The temperature is progressively raised to 235° C. and the amidification and esterification reaction is carried out in about 1 hour 30 minutes.

0.655 part of triethanolamine orthotitanate is then added and the polycondensation is carried out in about 3 hours, whilst the temperature is raised to 267° C. and the pressure lowered to 0.5 mm Hg.

A white polymer is obtained which is extruded in the form of strands, and which has the following characteristics:

| intrinsic viscosity | 0.77 |
|---|---|
| viscosity in the molten state at 260° C | 650 poise |
| number of —COOH end groups per ton of polymer | 47 |
| number of —$NH_2$ end groups per ton of polymer | 112 |
| degree of whiteness | 86% |
| Y luminosity | 37% |
| dominant wavelength | 573.5 nm |

EXAMPLE 5 (COMPARISON)

913 parts of isophthalic acid, 1,298 parts of 1,6-hexanediol, 1,551 parts of the salt of hexamethylenediamine and isophthalic acid, and 0.543 part of triethanolamine orthotitanate are introduced simultaneously into an autoclave provided with the usual means of heating and regulation.

The reaction is carried out under the same conditions as in Example 1, the polycondensation reaction under vacuum taking place after the addition of a second fraction of 0.543 part of triethanolamine orthotitanate.

The polymer obtained is transparent and yellow-colored. It possesses the following characteristics:

| intrinsic viscosity | 0.65 |
|---|---|
| viscosity in the molten state at 260° C | 630 poise |
| acid end groups per ton of polymer | 69 |
| amine end groups per ton of polymer | 140 |
| softening point | 150° C |
| degree of whiteness | 73% |
| luminosity | 23.3% |
| dominant wavelength | 577.7 nm |

It should be noted that this polymer (derived from diacids substituted in the meta-position) possesses colorimetric characteristics and a softening point which are insufficient.

What is claimed is:

1. A moldable polyester-amide characterised in that it is derived from:

an aromatic organic diacid (1) whose carboxyl groups are directly attached to an aromatic ring in the para-position;

a primary diol (2) of the general formula HO—$CH_2$—R—$CH_2$—OH in which R represents either a straight aliphatic chain comprising at least 4 carbon atoms, or an aliphatic chain branched by alkyl or aryl groups, or an aromatic ring; and a salt of an organic diacid (3) and a primary diamine of aliphatic character (4);

and being further characterised in that it possesses a degree of whiteness equal to or greater than 80% and a luminosity equal to at least 35%, as defined in standard specification ASTM-E 308-66, and a number of —$NH_2$ end groups equal to or greater than 30 per ton of polymer, preferably greater than 40.

2. A shaped article derived from a polyester-amide as defined in claim 1.

3. A polyester-amide for textile usage as defined in claim 1, further characterised in that it is derived from:

an aromatic organic diacid (1) whose carboxyl groups are directly attached to an aromatic ring in the para-position;

a primary diol (2) of the general formula HO—$CH_2$—R—$CH_2$—OH in which R represents a straight aliphatic chain comprising at least 4 carbon atoms; and a salt of an organic diacid (3) and a primary diamine having an unsubstituted carbon chain, which may comprise one or more aromatic rings having a para-para structure;

the polyester-amide having a melting point equal to or greater than 180° C., and possessing a degree of whiteness equal to or greater than 80%, and a luminosity at least equal to 35% as defined in standard specification ASTM-E 308-66, and a number of —$NH_2$ end groups equal to or greater than 30 per ton of polymer, preferably greater than 40.

4. A yarn, a film, or a fiber derived from a polyesteramide as defined in claim 3.

* * * * *